(12) United States Patent
Kimura et al.

(10) Patent No.: US 6,746,490 B2
(45) Date of Patent: Jun. 8, 2004

(54) WINDING METHOD AND STRUCTURE FOR STATOR COILS

(75) Inventors: Mitsuru Kimura, Nagano-ken (JP); Shigeru Nishida, Nagano-ken (JP)

(73) Assignee: Tamagawa Seiki Kabushiki Kaisha, Nagano-ken (JP)

( * ) Notice: Subject to any disclaimer, the term of this patent is extended or adjusted under 35 U.S.C. 154(b) by 0 days.

(21) Appl. No.: 10/216,891

(22) Filed: Aug. 13, 2002

(65) Prior Publication Data

US 2004/0031874 A1 Feb. 19, 2004

(51) Int. Cl.[7] ................................................ H02K 15/09
(52) U.S. Cl. ........................................ 242/433; 29/605
(58) Field of Search ................................. 242/433, 437, 242/448; 29/605

(56) References Cited

U.S. PATENT DOCUMENTS 3,464,106 A    9/1969  Barrett 5,698,923 A    12/1997  Scherzinger et al.
2002/0011755 A1  1/2002  Shteynberg et al.

FOREIGN PATENT DOCUMENTS

| GB | 2 325 787 A | 12/1998 |
| GB | 2 362 269 A | 11/2001 |
| JP | 6-233484 A | 8/1994 |
| JP | 2001-161039 A | 6/2001 |
| JP | 2002-64962 A | 2/2002 |
| WO | WO 99/14840 A1 | 3/1999 |

*Primary Examiner*—Emmanuel Marcelo
(74) *Attorney, Agent, or Firm*—Sughrue Mion, PLLC

(57) ABSTRACT

Disclosed are a winding method and structure for stator coils in which each stator coil is wound in series around a plurality of ones of coil bobbins fitted onto each stator tooth, whereby the number of coil end portions coming out from the stator coils is reduced, thereby achieving an improvement in terms of operational efficiency and reliability. In the winding method and structure for the stator coils, each stator coil is wound continuously and in series around a plurality of ones of the coil bobbins to form a series winding stator coil body, with a pair of coil ending portions coming from the ends of the series winding stator coil body.

5 Claims, 8 Drawing Sheets

WINDING METHOD AND STRUCTURE FOR STATOR COILS

BACKGROUND OF THE INVENTION

1. Field of the Invention

The present invention relates to a winding method and structure for stator coils and, more particularly to a novel improvement according to which each stator coil is wound in series around a plurality of ones of the coil bobbins provided on the stator teeth body to form coil end portions at both ends, whereby it is possible to achieve a reduction in the number of coil end portions coming out from the stator coils and an improvement in operational efficiency in soldering or the like and in quality.

2. Description of the Related Art

FIGS. 4 through 8 show a conventional winding method and structure for a stator coil of this type.

Referring to FIGS. 4 and 5, numeral 1 indicates a stator teeth body which has a ring-like general configuration and a plurality of (nine) stator teeth 2 and which is formed through lamination in the axial direction, a cylindrical coil bobbin 4 with a stator coil 3 wound thereon being fitted onto each stator tooth 2.

As shown in FIG. 6, the stator teeth body 1 whose stator teeth 2 are equipped with the coil bobbins 4 is forced into the interior of an inner wall 5a of a cylindrical stator yoke 5, and the stator teeth body 1 and the cylindrical stator yoke 5 constitute a stator 10.

In the outer periphery of the cylindrical stator yoke 5, there is provided a ring-like printed board 11 constructed as shown in FIG. 8, and, in the outer edge of this ring-like printed board 11, there are formed eighteen terminal patterns 1A through 18A.

Pairs of coil end portions 3a and 3b constituting the coil ends of the stator coils 3 wound around the bobbins 4 are respectively soldered to the terminal patterns 1A through 18A.

Thus, by predetermined connection patterns 20, 21, 22, and 23, the terminal patterns 1A through 18A are constructed for driving in the three phases of U-phase, V-phase, and W-phase.

The conventional winding method and structure for a stator coil, constructed as described above, have the following problem.

Since the stator coils wound around the coil bobbins are independent of each other, it is necessary to solder the eighteen in total of coil end portions to the terminal patterns of the printed board, with the result that the soldering operation requires a lot of manpower and cost.

SUMMARY OF THE INVENTION

The present invention has been made with a view toward solving the above-mentioned problem. It is particularly an object of the present invention to provide a winding method and structure for a stator coil in which a stator coil is wound in series around a plurality of coil bobbins of the coil bobbins provided on the stator teeth body to form coil end portions at both ends, whereby it is possible to achieve a reduction in the number of coil end portion lead-outs of the stator coil and an improvement in operability in soldering or the like and in quality.

According to the present invention, there is provided a stator coil winding method in which coil bobbins having stator coils are provided on a stator teeth body formed in a ring-like general configuration and having a plurality of outwardly protruding stator teeth and in which the stator teeth body is mounted to a cylindrical stator yoke, characterized in that each stator coil is wound continuously and in series around a plurality of coil bobbins of the coil bobbins to form a series winding stator coil body, and the series winding stator coil body has at its ends a pair of coil end portions. Also, the stator coil winding method has such a structure that: each series winding stator coil body is formed by three coil bobbins; three such series winding stator coil bodies are provided; and each stator coil is wound around the three coil bobbins of each series winding stator coil body, with the coil bobbins being penetrated by and arranged at intervals on an elongated bar-like winding frame jig. Also, according to the present invention, in the stator coil winding structure in which coil bobbins having stator coils are provided on a stator teeth body formed in a ring-like general configuration and having a plurality of outwardly protruding stator teeth and in which the stator teeth body is mounted to a cylindrical stator yoke, the structure is characterized in that a series winding stator coil body formed by winding stator coils around a plurality of coil bobbins of the coil bobbins in series and continuously is provided, and a plurality of such series winding stator coil bodies are provided on the stator teeth body.

DESCRIPTION OF THE PREFERRED EMBODIMENT

Figure 6:
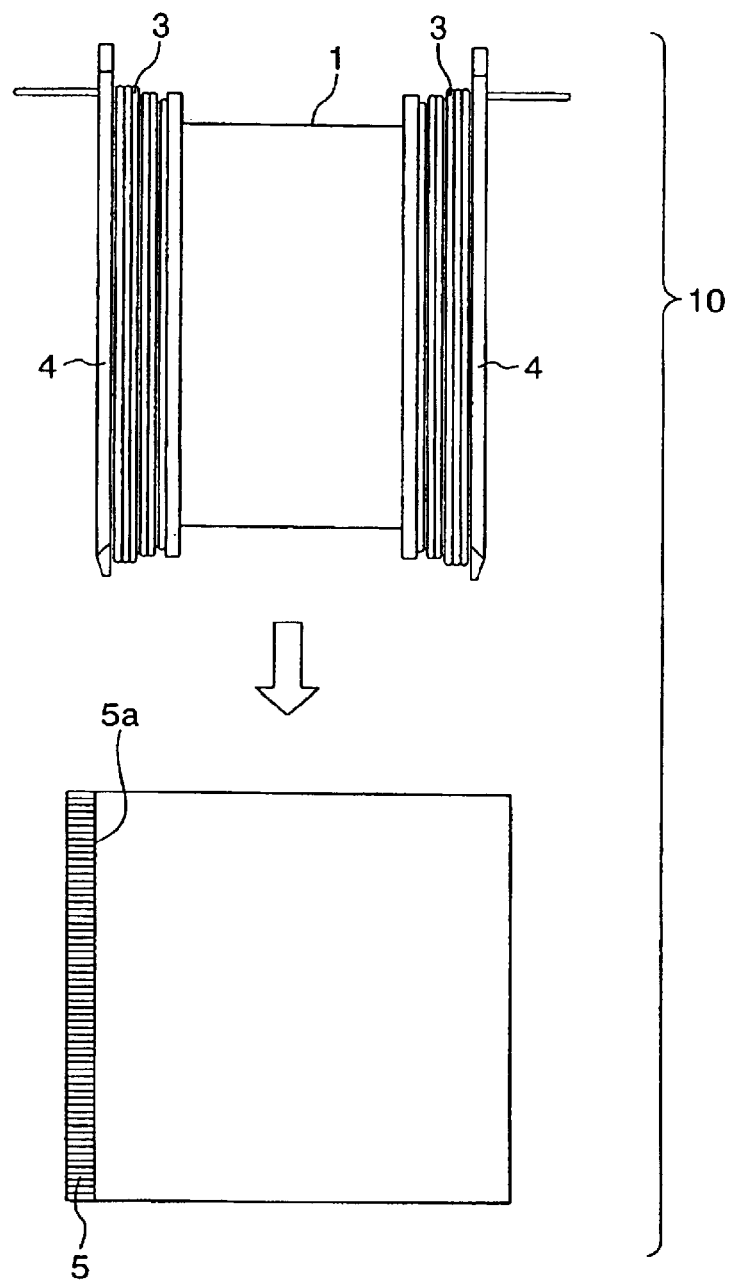
FIG. 6 is a schematic diagram showing how a stator teeth body is inserted into a cylindrical stator yoke.
Figure 7:
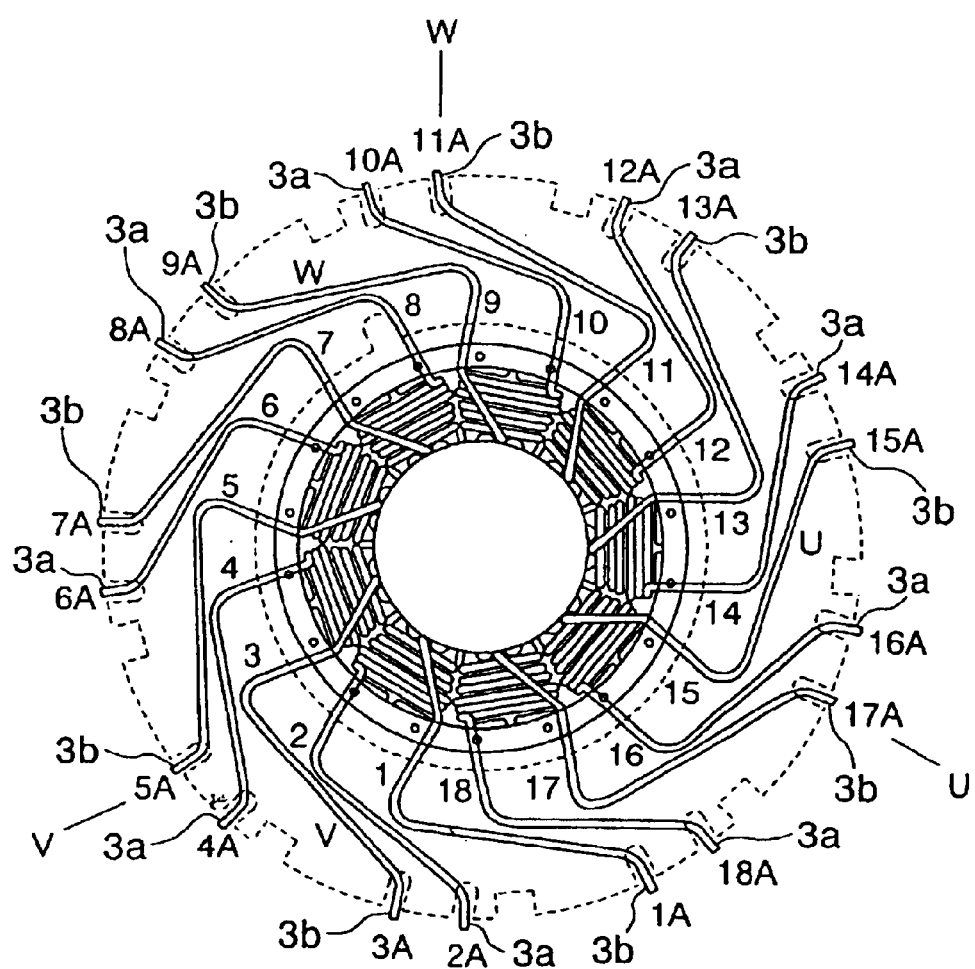
FIG. 7 is a schematic diagram showing connection between stator coils of a conventional stator teeth body and a ring-like printed board.

A preferred embodiment of a winding method and structure for stator coils of the present invention will now be described with reference to the drawings. The components which are the same as or equal to those of the conventional example will be indicated by the same reference numerals. FIG. 6, which is applicable to the present invention, will be referred to in the following description.

Figure 1:
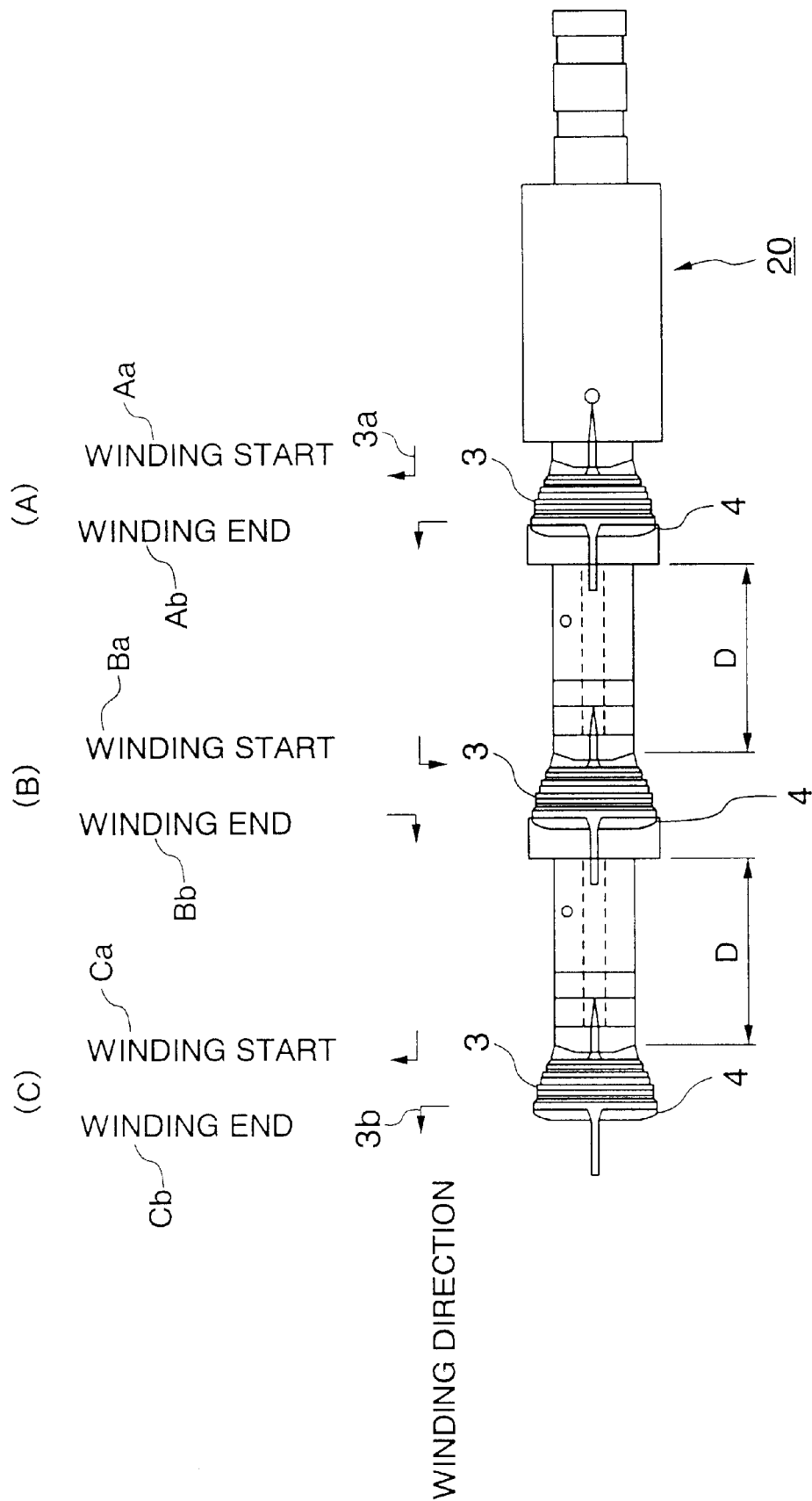
FIG. 1 is a schematic diagram showing winding using a winding frame jig applied to a stator coil winding method of the present invention.

FIG. 1 shows an elongated bar-like winding frame jig 20 developed particularly for this invention. Three coil bobbins 4 are detachably mounted to the winding frame jig 20 at a predetermined interval D.

A stator coil 3 is wound around the coil bobbins 4 in the order: A, B, and C of FIG. 1. That is, the stator coil 3 is wound around the coil bobbin 4 at position A in a direction indicated by an arrow, the winding start being indicated by Aa and the winding end by Ab, which then constitutes the winding start Ba at position B; the winding end Bb at position B successively constitutes the winding start Ca at position C, the winding end at this position being indicated by Cb.

Figure 2:
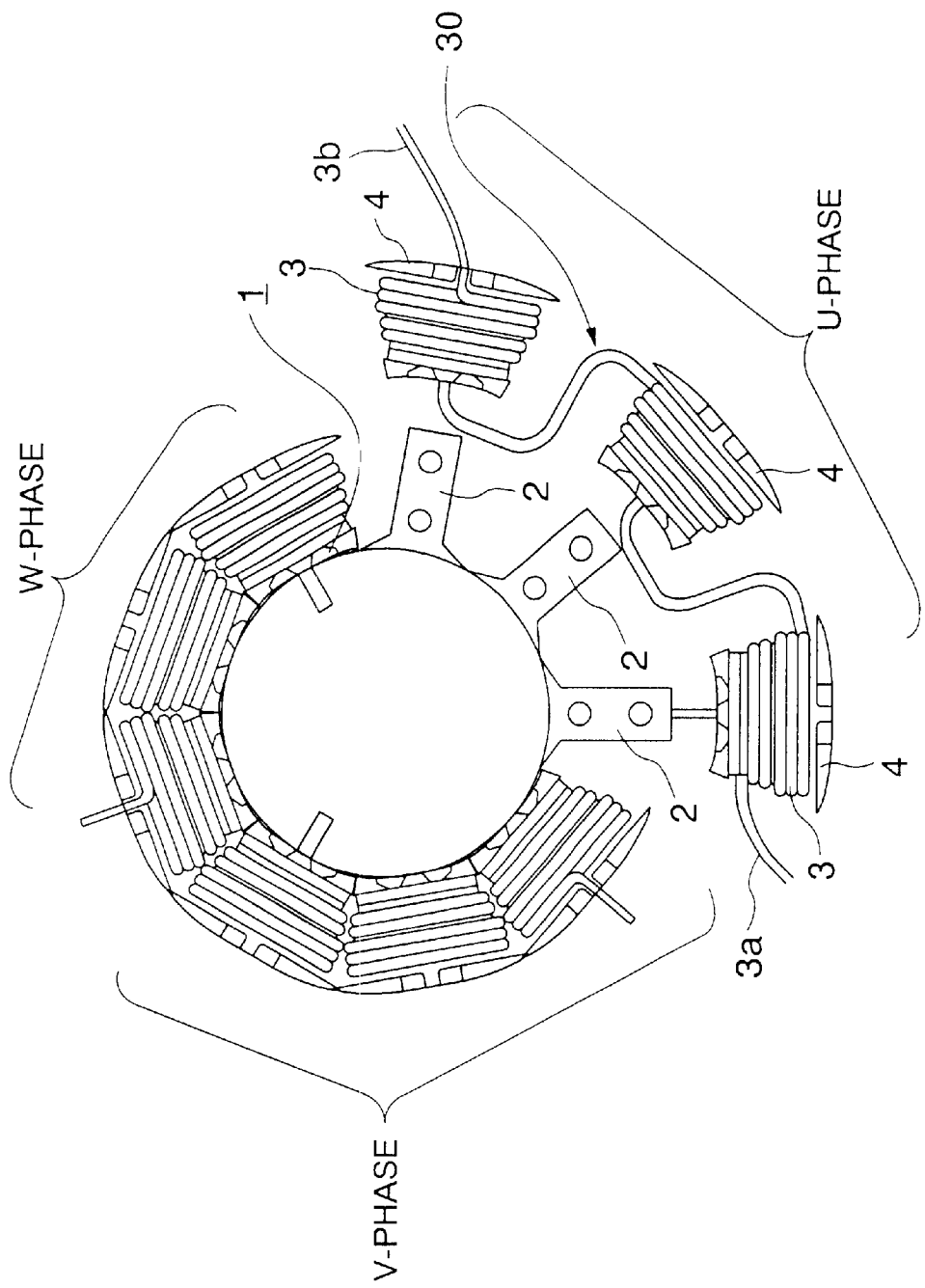
FIG. 2 is a schematic diagram showing how coil bobbins which have undergone winding by using the winding frame jig of FIG. 1 are mounted to stator teeth.

Thus, the winding start Aa at position A and the winding end Cb at position C correspond to the coil end portions 4a and 4b at the ends of the three coil bobbins 4 around which the stator coil 3 is wound in series. As shown in FIG. 2, by continuously winding the stator coil 3 in series around three coil bobbins 4, a series winding stator coil body 30 is formed.

As shown in FIG. 2, the three coil bobbins 4 around which the stator coil 3 is wound by the winding frame jig 20 of FIG. 1 constitute the U-phase. Like the U-phase, each of the other phases: V-phase and W-phase, is formed by three coil bobbins 4.

The number of coil bobbins 4 per phase (one of the U-, V-, and W-phases) is not restricted to three; it may also be two, four, etc.

Thus, as described above, the coil bobbins 4 of the U-, V-, and W-phases, each consisting of three bobbins, are fitted onto stator teeth 2 of a stator teeth body 1.

Each phase only involves a pair of coil end portions 3a and 3b; since there are nine coil bobbins 4 in total for the three phases, there are six coil end portions 3a and 3b in total extending from these coil bobbins, which is a substantial reduction as compared with the conventional structure, in which there are eighteen coil end portions.

Figure 3:
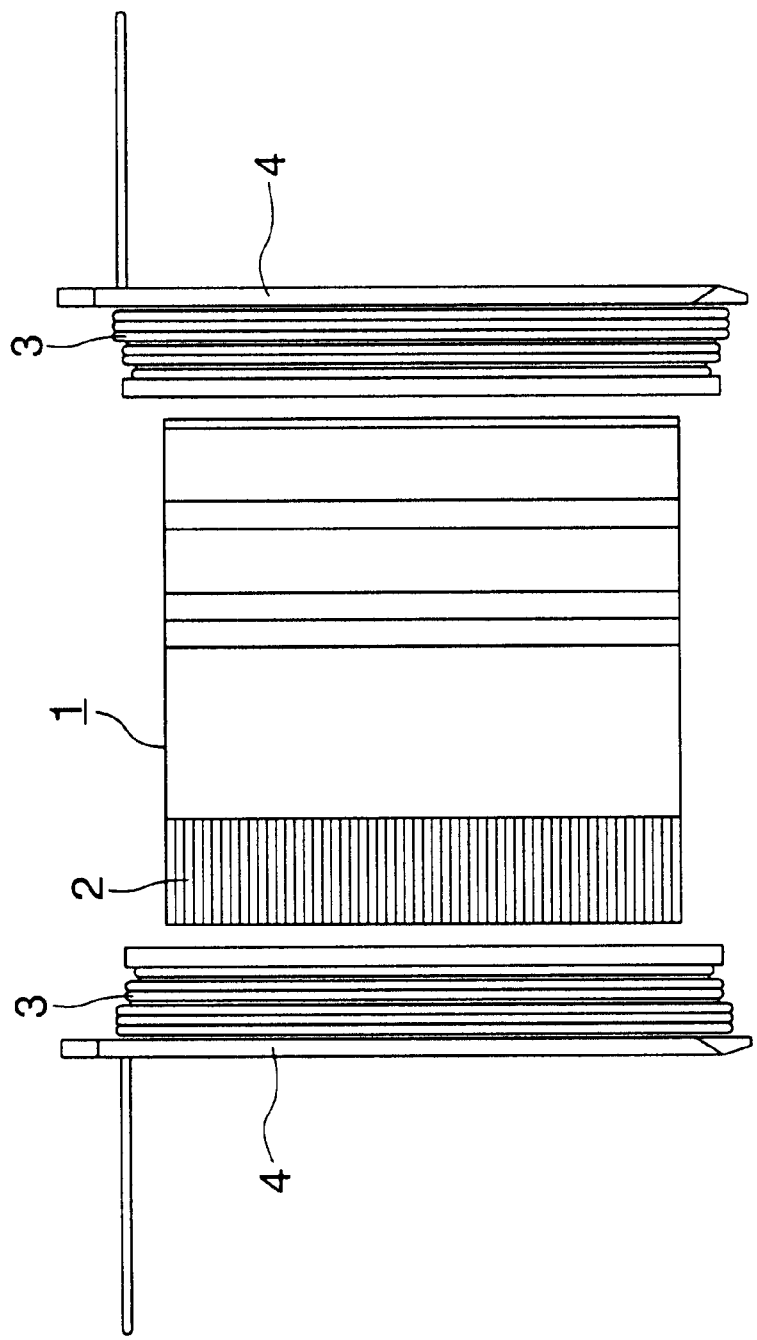
FIG. 3 is an exploded sectional view showing the stator teeth body of FIG. 2.
Figure 4:
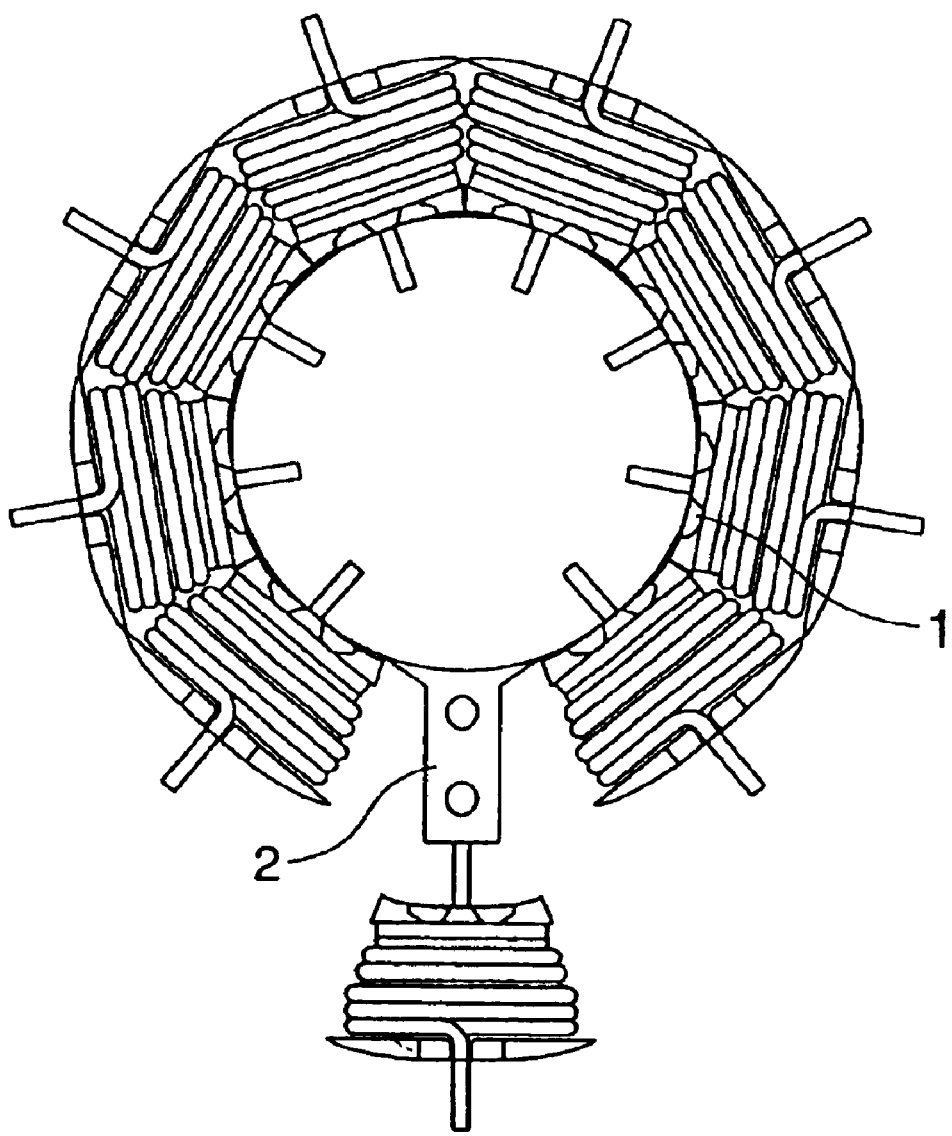
FIG. 4 is a schematic diagram showing a conventional stator teeth body.
Figure 5:
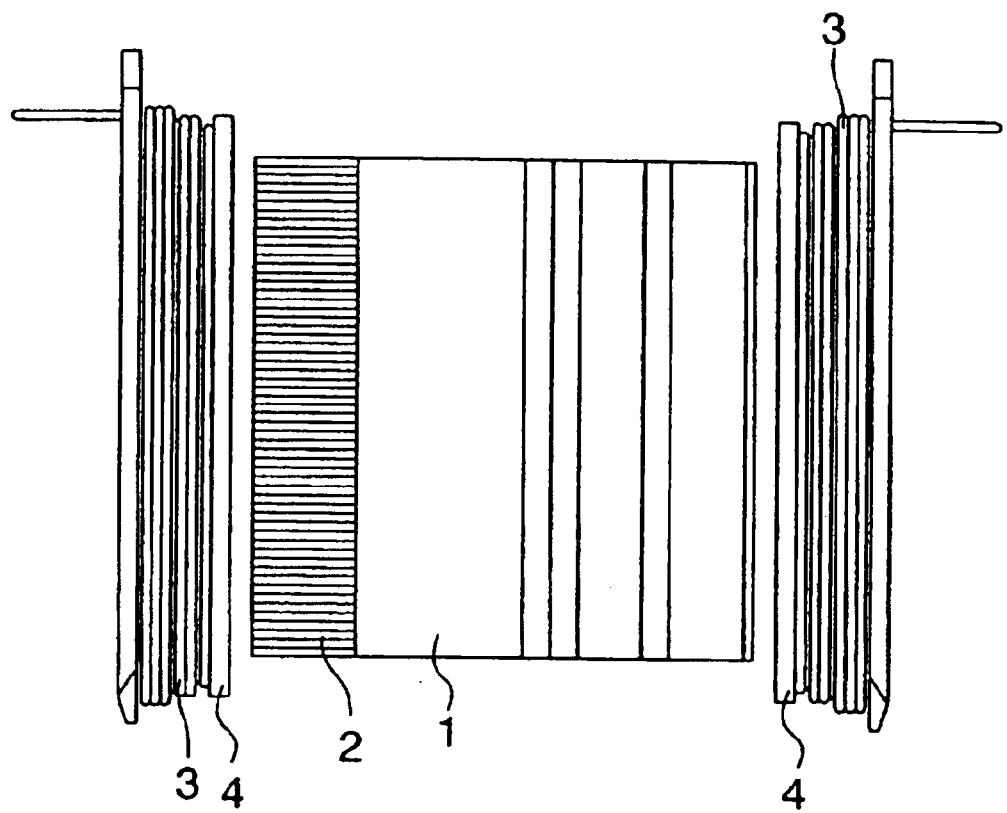
FIG. 5 is an exploded sectional view of FIG. 4.

The stator teeth body 1 formed as shown in FIG. 2 and equipped with the coil bobbins 4 is formed as shown in the exploded sectional view of FIG. 3; by forcing this stator teeth body 1 into a cylindrical yoke 5 shown in FIG. 6, a stator 10 is formed.

Figure 8:
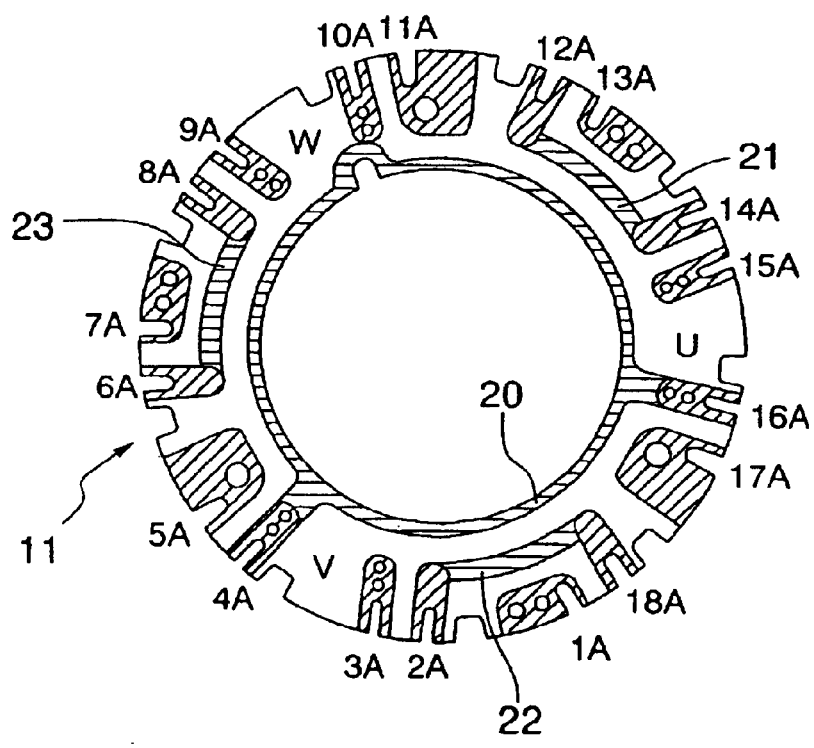
FIG. 8 is a plan view of the ring-like printed board of FIG. 7.

Unlike the conventional printed board of FIG. 8, a ring-like printed board 11 mounted to the stator 10 has six terminal patterns (not shown). Since the number of coil end portions 3a and 3b is small, it is possible to effect connector connection with the ring-like printed board 11 omitted. Further, the means for winding the stator coil 3 around the coil bobbins 4 is not restricted to a bar-like jig of FIG. 1; it is also possible to effect winding with the coil bobbins 4 mounted to an arcuate jig.

The winding method and structure for stator coils of the present invention, constructed as described above, provides the following advantages.

Since the winding of the stator coils on the coil bobbins provided on the stator teeth is effected in series in blocks for the different phases, it is possible to substantially reduce the number of coil end portions, whereby soldering to the ring-like printed board is facilitated and an improvement in quality is achieved.

Further, since the number of coil end portions can be reduced, it is possible to effect connector connection with the ring-like printed board omitted, whereby it is possible to achieve a reduction in stator size and cost.

What is claimed is:

1. A stator coil winding method in which a first plurality of coil bobbins having stator coils are provided on a stator body formed in a ring-like configuration and having a plurality of outwardly protruding stator teeth and in which the stator body is mounted to a cylindrical stator yoke, comprising:

mounting a second plurality of coil bobbins, representing a portion of said first plurality of coil bobbins, on a jig in a spaced-apart relationship;

winding a wire continuously and in series around said second plurality of coil bobbins to form a series winding bobbin assembly having a pair of coil end portions; and mounting said series winding bobbin assembly to a stator coil body, wherein each coil bobbin is mounted to a respective stator tooth on said stator body.

2. A stator coil winding method according to claim 1, wherein said each series winding bobbin assembly is formed by three coil bobbins, and said mounting step comprises mounting three series winding bobbin assemblies to said body.

3. A stator coil winding method according to claim 2, wherein said each stator coil is wound around the three coil bobbins of said each series winding stator coil body, with the coil bobbins being penetrated by and arranged at intervals on an elongated bar-like winding frame jig.

4. A stator coil winding method according to claim 1, wherein said each stator coil is wound around the three coil bobbins of said series winding bobbin assembly, with the coil bobbins being penetrated by and arranged at intervals on an elongated bar-like winding frame jig.

5. A stator coil winding structure comprising:

a stator body formed generally in a ring-like configuration and having a plurality of outwardly protruding stator teeth, said body being adapted for mounting to a cylindrical stator yoke;

a first plurality of coil bobbins, each having a stator coil wound thereon and being mounted on a respective one of said stator teeth, said first plurality of coil bobbins comprising a plurality of stator coil assemblies, wherein the structure of each stator coil assembly is formed by winding a stator coil around a second plurality of coil bobbins, comprising a portion of said first plurality of coil in series and continuously, and wherein each of the plurality of stator coil assemblies has a pair of coil end portions.

* * * * *